United States Patent
Michielsens et al.

(10) Patent No.: US 9,036,513 B2
(45) Date of Patent: May 19, 2015

(54) METHOD FOR COMMUNICATING BETWEEN CUSTOMER DEVICE AND SERVER DEVICE

(75) Inventors: Jan Michielsens, Sandhoven (BE); Pascal Justen, Sint-Pieters-Woluwe (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/702,399

(22) PCT Filed: Jun. 21, 2011

(86) PCT No.: PCT/EP2011/060270
§ 371 (c)(1),
(2), (4) Date: Jan. 18, 2013

(87) PCT Pub. No.: WO2012/000824
PCT Pub. Date: Jan. 5, 2012

(65) Prior Publication Data
US 2013/0114617 A1 May 9, 2013

(30) Foreign Application Priority Data

Jun. 30, 2010 (EP) .................................... 10290358

(51) Int. Cl.
*H04B 1/44* (2006.01)
*H04L 12/66* (2006.01)
(Continued)

(52) U.S. Cl.
CPC .......... *H04L 12/66* (2013.01); *H04L 29/08522* (2013.01); *H04L 29/08225* (2013.01); *H04L 9/0872* (2013.01); *H04L 29/08162* (2013.01);
(Continued)

(58) Field of Classification Search
USPC .................................. 370/277, 401, 299, 278
See application file for complete search history.

(56) References Cited

U.S. PATENT DOCUMENTS 6,563,430 B1 * 5/2003 Kemink et al. ................ 340/8.1
7,778,193 B2 8/2010 Mizuno et al.
(Continued)

FOREIGN PATENT DOCUMENTS

EP 1850527 A1 10/2007
EP 2134114 A1 12/2009
(Continued)

OTHER PUBLICATIONS

International Search Report PCT/ISA/210 for International Application No. PCT/EP2011/060270 dated Jul. 15, 2011.
(Continued)

*Primary Examiner* — Ricky Ngo
*Assistant Examiner* — Dewanda Samuel
(74) *Attorney, Agent, or Firm* — Harness, Dickey & Pierce, P.L.C.

(57) ABSTRACT

The method includes interacting between a first proximity transceiver which is associated to the customer device, and a second proximity transceiver; and generating thereby interaction information. The method further includes defining an TR069 Management protocol object called proximity-object and defining thereby at least one TR069 Management protocol parameter related to the interaction information, and furthermore interchanging between the server device and the customer device at least one name-value pair of the at least one parameter of the proximity-object by means of TR69 Management protocol messages.

8 Claims, 1 Drawing Sheet

(51) Int. Cl.
*H04L 29/08* (2006.01)
*H04L 9/08* (2006.01)
*H04L 12/28* (2006.01)

(52) U.S. Cl.
CPC .......... *H04L 12/281* (2013.01); *H04L 12/2834* (2013.01); *H04L 67/125* (2013.01); *H04L 67/12* (2013.01)

(56) References Cited

U.S. PATENT DOCUMENTS

| | | | |
|---|---|---|---|
| 8,294,554 B2* | 10/2012 | Shoarinejad et al. | 340/10.1 |
| 2006/0120305 A1* | 6/2006 | Van Den Bosch et al. | 370/254 |
| 2006/0280127 A1 | 12/2006 | Mizuno et al. | |
| 2008/0133718 A1* | 6/2008 | Bouchat et al. | 709/220 |
| 2008/0133752 A1* | 6/2008 | Liekens et al. | 709/225 |
| 2009/0028170 A1* | 1/2009 | Jiang et al. | 370/406 |
| 2009/0037563 A1* | 2/2009 | Wu | 709/220 |
| 2009/0132698 A1 | 5/2009 | Barnhill, Jr. | |
| 2009/0206986 A1* | 8/2009 | Murakami et al. | 340/5.8 |
| 2009/0302998 A1* | 12/2009 | Trappeniers et al. | 340/5.61 |
| 2010/0030902 A1* | 2/2010 | Justen et al. | 709/228 |
| 2010/0138895 A1* | 6/2010 | Bouchat et al. | 726/1 |

FOREIGN PATENT DOCUMENTS

| | | |
|---|---|---|
| JP | 4465353 B2 | 5/2010 |
| WO | WO-2009049325 A1 | 4/2009 |

OTHER PUBLICATIONS

Notice of Preliminary Report for corresponding Korean Application No. 10-2013-7002230 dated Apr. 4, 2014 and English translation thereof.

Lupton, et al. eds., "TR-098: Internet Gateway Device Data Model for TR-069," *The Broadband Forum Technical Report*, Sep. 2008, www.broadband-forum.org/technical/download/TR-098_Amendment-2.

* cited by examiner

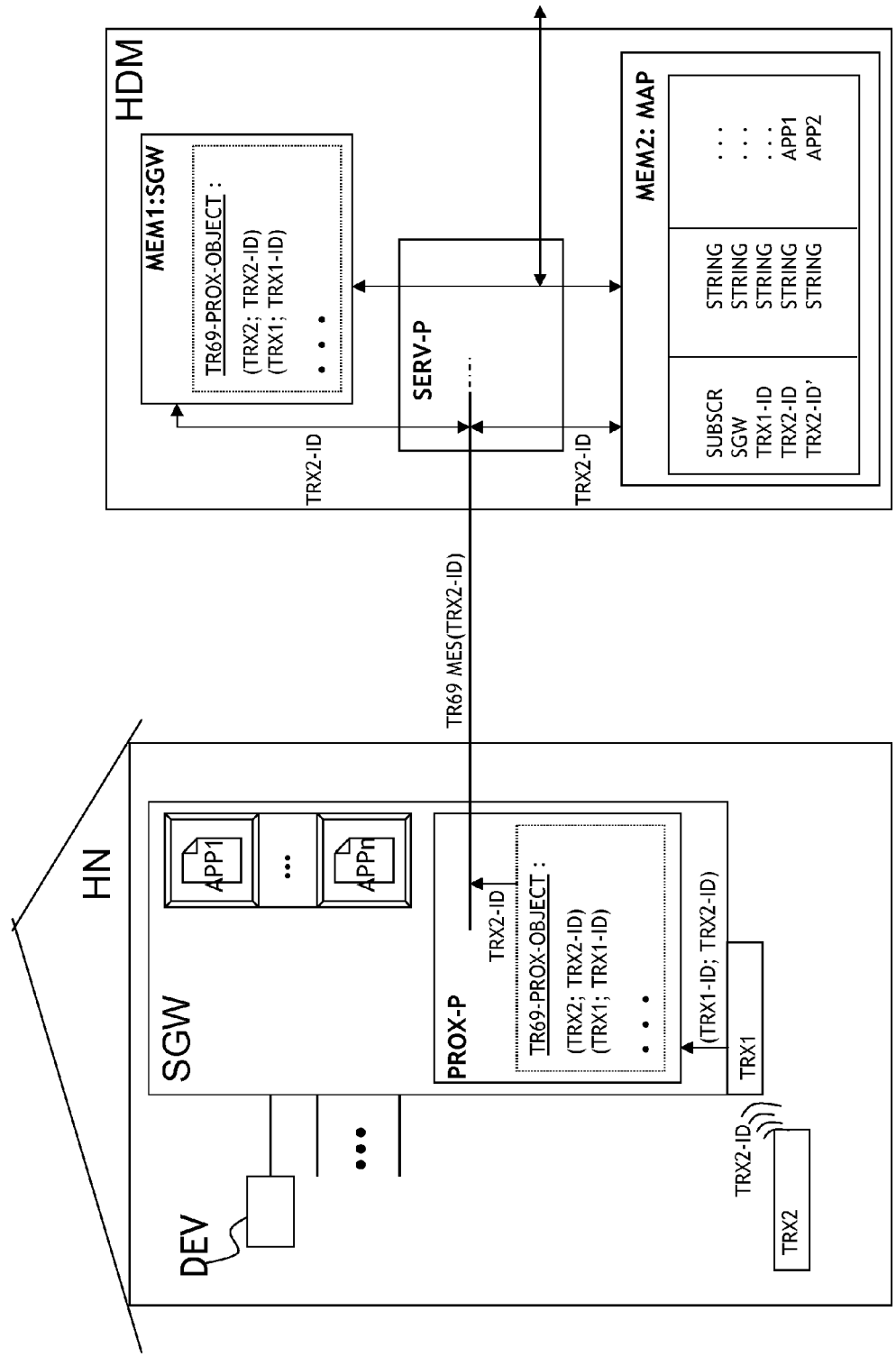

METHOD FOR COMMUNICATING BETWEEN CUSTOMER DEVICE AND SERVER DEVICE

The present invention relates to a method for communicating between a server device and a customer device in a proximity-based-interaction environment and the server device and customer device respectively.

Such devices and method are already known in the art, e.g. from the European Patent Application with ref. EP 2 134 114 A1 with short title "Method for providing to an end device access to a service, to an end device and to a mobile terminal realizing such a method" with date of publication Dec. 16, 2009. Therein, a method for communicating between a server device and a customer device in a proximity based interaction environment is described. The method comprises interacting between a first proximity transceiver being associated to the customer device and a second proximity transceiver. The two transceivers are thereby generating interaction information.

Such a customer device can be implemented by means of an end-user device, set-up box, Residential Gateway, Home Gateway, etc. . . . .

Such a proximity based interaction environment is described in paragraph 12 of that application i.e. it can be defined as all interaction means and method where physical closeness of objects, devices or persons are involved. Proximity-based interaction can be based on radio-frequency detection or communication, RFID, NFC, IR, computer-vision, capacitive detection, light sensors, . . . . The also used terminology touch-based interaction should be regarded as a sub-set of Proximity based interaction. In addition RFID technology referred herein is intended to also include Near Filed Communication, Electronic Product Code global and related technologies and that the tag and tag reader mentioned for the implementation of this RFID technology can be replace by barcodes, IR communication, image recognition and the like.

In the referred application, the proximity technology is used to trigger, either via the first transceiver or either via the second transceiver, a transfer server that requests a service manager to provide to the customer device access to a particular service. A first Example is described in paragraph 14 i.e. activation at the customer device of subscription and services available to the user such as Channels and Video On Demand. A second example is described in paragraph 15 i.e. the activation of e.g. a user's DSL-subscription at home. A third example is given in paragraph 16 where a trigger in the proximity environment of a Residential Gateway instructs a Home Device Manager (i.e. an Auto configuration Server) to activate e.g. a user's firewall. According to this example, the "touched" Residential Gateway forwards this trigger to a Subscription Transfer Server which contacts on its turn a User Subscription Database before instructing the Home Device Manager.

According to this third example, it is clear that the activation/deactivation of such present services is not provided according to an efficient way. Furthermore, presume that, according to this third Example, the User's firewall was already activated; a number of communication messages in the network are executed in order to finally instruct the Home Device Manager to activate a service with is already active i.e. no history is kept where it should be kept.

An object of the present invention is to provide a method for communicating between a server device and a customer device in a proximity-based-interaction environment and the server device and customer device respectively, such as the above known described ones, but wherein above mentioned drawbacks are anticipated.

According to the invention, this object is achieved due to the fact that a TR69 Management protocol object called proximity-object is defined whereby at least one TR69 Management protocol parameter related to the above mentioned interaction information is defined as well. Furthermore, the method comprises interchanging between the server device and the customer device at least one name-value pair of the at least one parameter of the proximity-object by means of TR69 Management protocol messages.

In this way, the trigger which is generated in the proximity environment is directly translated in a convenient and efficient home environment related protocol i.e. the TR69 Management Protocol. Due to the direct communication between customer device and server device, the required information becomes directly available at the server device whereby eventual decisions and actions can be taken directly at the server device.

According to the above example of activating a firewall, the customer device will always be able to communicate with the server device even if all communication ports will (by default) be closed by the firewall, since the current basic idea uses the TR-069 management protocol-proximity object in order to transfer/convey proximity events towards the server device.

It has to be explained that the DSL-Forum defined this Customer Premises Equipment Wide Area Network Management Protocol, shortly called the WAN Management Protocol in the Technical Report TR69. This TR69 Management Protocol is intended for communication between Customer Premises Equipment and an Auto-configuration Server, shortly called an ACS i.e. the above mentioned server device. The ACS is an auto-configuration server, as the component in a broadband network responsible for auto-configuration of the CPE for advance services. The CPE is the Customer Premises Equipment i.e. the above mentioned customer device, which is capable of being managed by an ACS. An RPC is a Remote Procedure Call whereby a "parameter" defines a name-value pair representing a manageable CPE parameter that is made accessible to an ACS for reading/or writing. An Object defines a data-model that describes a number of related parameters i.e. a data-structure consisting of data-fields; and related methods together with their interactions. In this way a data model supports data and computer systems by providing the definition and format of data-objects.

Another characteristic feature of the present invention is that the interaction information comprises an identification of the second proximity transceiver. Indeed, by providing the identification of the second proximity transceiver a specific "action" can be triggered whereby the kind of "action" can be determined based upon the identification of the second proximity transceiver.

The method further comprises forwarding by the first proximity transceiver to a proximity processor of the customer device at least part of the interaction information. This interaction information is further comprised by the proximity processor in such a message for the server device. In this way, the interaction information e.g. the identification of the second proximity transceiver is directly present at the server device. The server device is hereby enabled to determine by itself whether action needs to be taken.

A further characteristic feature is that the server device comprises a first memory for storing the at least one name-value pair of the at least one parameter of the proximity-object i.e. the trigger that was given by the proximity environment such as an activation of a service, is hereby stored at the server device. In this way, a history of e.g. activated/deactivated services is kept the server device.

Furthermore, the method comprises directly retrieving from the messages and storing in relation to each other in a second memory of the server device:
 the at least one name-value pair of the at least one parameter of the proximity-object; and
 anyone of the customer device and a user of the customer device.

In this way, no extra communication in the network is required to retrieve e.g. via a Subscription Transfer Server from User Subscription database customer profile information. By taking advantage of the inherent available information according to the TR69 protocol the customer device information and information of the end-user of the customer device becomes directly available at the server device and can directly be stored in relation to the received proximity-object parameter information.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein FIG. 1 represents a Home Network in an Access Network.

The working of the device according to the present invention in accordance with its telecommunication environment that is shown in FIG. 1 will be explained by means of a functional description of the different blocks shown therein. Based on this description, the practical implementation of the blocks will be obvious to a person skilled in the art and will therefor not be described in details. In the mean time, the principle working of the method for communicating between a server device and a customer device will be described in further detail.

Referring to FIG. 1 a Home Network in an Access Network is shown.

The Access Network comprises a Home Network HN and the server device, called a Home Device Manager HDM. The Home Device Manager is a server such as e.g. an Auto Configuration Server ACS.

The Home Network HN comprises a customer device i.e. a Service Gateway SGW which is coupled to a plurality of end-user devices DEV (only one device DEV is shown). As remarked above, the customer device can as well be implemented with one of the end-user devices such as a Personal Computer or a Set-up box or a Home Gateway, etc.

A first proximity transceiver TRX1 is associated to the customer device SGW. This means that the first proximity transceiver TRX1 is e.g. coupled to the customer device or is inserted into the customer device or is permanently integrated in it etc.

A second proximity transceiver TRX2 is brought in the interaction environment of the customer device SGW. Hereby interaction i.e. communication is enabled between both receivers TRX1 and TRX2. As a consequence of this interaction, interaction information such as e.g. identification information TRX2-ID of the second transceiver is generated.

The present application defines a newly TR69 Management protocol object called proximity-object and defines thereby different TR69 management protocol parameters which are related to the interaction information.

Possible definitions for the TR069 proximity-object are described here below for a Radio Frequency interaction environment.

Remark that ID is standing for Identification. Further abbreviations are self-explaining.

1) RF-ID TR-069 Object with parameters:
 RF-ID-OBJECT.RF-READER.{i}.Key
 RF-ID-OBJECT.RF-READER.{i}.Description
 RF-ID-OBJECT.RF-READER.{i}.State
 RF-ID-OBJECT.RF-READER.{i}.NbrRFids
 RF-ID-OBJECT.RF-READER.{i}.RF-ID.{i}.Key
 RF-ID-OBJECT.RF-READER.{i}.RF-ID.{i}.Description
 RF-ID-OBJECT.RF-READER.{i}.RF-ID.{i}.State
OR:
2) RF-ID TR-069 Object with parameters:
 RF-ID-OBJECT.RF-READER.{i}.ReferenceID
 RF-ID-OBJECT.RF-READER.{i}.Key
 RF-ID-OBJECT.RF-READER.{i}.Description
 RF-ID-OBJECT.RF-READER.{i}.State
 RF-ID-OBJECT.RF-READER.{i}.NbrRFids
 RF-ID-OBJECT.RF-ID.{i}.Key
 RF-ID-OBJECT.RF-ID.{i}.Description
 RF-ID-OBJECT.RF-ID.{i}.State
 RF-ID-OBJECT.RF-ID.{i}.ReaderReferenceID
With Remarks:
 ReferenceID can alternatively be replaced with a local unique ID
 ReaderReferenceID points to RF-READER ReferenceID value or to an RF-ID-OBJECT.RF-READER.{i} or variant.

Furthermore, it has to be remarked that the different values for the {RF-ID-OBJECT.RF-READER.{i}.State} can be implemented with as well an administrative value i.e. forced by the operator; as an operational state-value i.e. the actual status of the RF-READER which reflects the operation-status such as installed; active; failed etc.; or a combination of both.

An identical remark applies for the RF-ID-OBJECT.RF-READER.{i}.RF-ID.{i}.State.

The customer device SGW is enabled to interchange with the server device HDM name-value pairs for the defined parameters of this proximity-object by means of TR69 Management protocol messages.

The customer device SGW comprises therefore a proximity processor PROX-P for reception of the interaction information from the first transceiver TRX1. Furthermore, the proximity processor PROX-P is enabled to process the received interaction information and to generate the name-value pairs for the defined parameters of the proximity-object and to comprise the processed interaction information in the TR069 Management protocol messages for the server device HDM.

The server device HDM comprises a server processor SERV-P. The server processor is enabled to interchange with the customer device SGW, according to the TR069 Management Protocol messages, the name-value pairs for the defined parameters of the proximity-object. This is shown in FIG. 1 with TR69 MES(TRX2-ID).

As part of the TR-069 communication protocol, active notifications can be set on the parameters of the proximity-object. This can also be achieved by a <<sentinel>> parameter which is incremented every time that new values for the object are instantiated and for which active notifications are enabled. This can be realized with a parameter such as:

RF-ID-OBJECT.UPDATE-COUNT

For both cases, in the event when the value of one of the parameters is changed, the server device HDM will automatically be informed by means of such active notification. Hereby the server device HDM is triggered to retrieve the values of the whole object tree under RF-ID-OBJECT.

The server device HDM comprises a first memory MEM1 and a second memory MEM2.

The first memory MEM1 stores the received values for the name-value pairs of the different parameters of the proximity-object.

Here below examples are given for the different parameters in the first memory MEM1:

With $\{i\}$: value 1 . . .

| Parameter | Type | Comment |
| --- | --- | --- |
| com.alu.touchatag.reader.id | String | Reader identifier |
| com.alu.touchatag.reader.description | String | Descriptive name |
| com.alu.touchatag.reader.state | String | e.g. installed, active, failure |
| com.alu.touchatag.reader.nbrrfid | Unsigned Int | Nbr of rf-id cards managed by this reader <= max nbr |
| com.alu.touchatag.rfid.idi{i} | String | Card identifier |
| com.alu.touchatag.rfid.id{i}.description | String | Descriptive name |
| com.alu.touchatag.rfid.id{i}.state | String | e.g. installed, active, failure |

Or

| Parameter | Type | Comment |
| --- | --- | --- |
| com.alu.touchatag.reader.{i}.RefId | String | Local unique ID |
| com.alu.touchatag.reader.{i}.id | String | Reader identifier |
| com.alu.touchatag.reader.{i}description | String | Descriptive name |
| com.alu.touchatag.reader.{i}.state | String | e.g. installed, active, failure |
| com.alu.touchatag.reader.{i}.nbrrfid | Unsigned Int | Nbr of rf-id cards managed by this reader <= max nbr |
| com.alu.touchatag.rfid.idi{i} | String | Card identifier |
| com.alu.touchatag.rfid.id{i}.description | String | Descriptive name |
| com.alu.touchatag.rfid.id{i}.state | String | e.g. installed, active, failure |
| com.alu.touchatag.rfid.id{i}.ReaderReferenceId | String | points to RF-READER ReferenceId value |

FIG. 1 shows values of the proximity object in the first memory MEM1 with a value TRX2-ID for the parameter TRX2 i.e. the identification of the second transceiver and a value TRX1-ID for the parameter TRX1 i.e. identification of the first transceiver.

Furthermore since the server processor SERV-P of the server device HDM is enabled to retrieve directly from the TR069 messages:

the name-value pairs for the parameter of the proximity-object; and the references/identification of the customer device and the end-user of the customer device, this information can be directly stored, in relation to each other, in the second memory MEM2.

Hereby, the history of the occurred interactions at the customer device which were translated to the values for the parameters of the proximity-object and which were communicated towards the server device can be kept at the server device. Due to the identification of related actions, based upon respective values for the parameters, for the respective customer device and user, such as e.g. activation of an application at the customer device, the second memory MEM2 provides a complete database of e.g. activated applications in the past for the respective customer device and end-user.

Here below a example is given for the mapping of the different parameters in the second memory MEM2.

An RF-Mapper table object with $\{i\},\{j\},\{k\}$: value 1 . . .

| Subscriber_id | | string | Identification of the end-user |
| --- | --- | --- | --- |
| HGW-id | | string | HDM GUID |
| RF-READER-ID{i} | | string | Identification of the RF_READER |
| RF-ID{j}-{k} | APPL-ID{j}-{k} | string | Identification RF-id card and application |

It has to be explained that the abbreviation HDM GUID is standing for a unique Device reference to identify the device HDM (i.e. identification for an Auto-Configuration Server).

FIG. 1 shows the history table MEM2 for a interaction with SUBCR being the end-user, the server device SGW, the first transceiver identification TRX1-ID and two times an identification for a second proximity transceiver TRX2-ID and TRX2-ID'. Both second transceiver identifications are identifying its respective interaction information of a previous occurred interaction in the interaction environment of the customer device SGW. The table MEM2 shows as well the related action e.g. an application such as APP1 and APP2 which were identified by the respective second transceiver identifications and which were executed in the past.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The functions of the various elements shown in FIG. 1 including any labeled functional blocks may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The invention claimed is:

1. A method for communicating between a server device and a customer device in a proximity based interaction environment,
said method comprises interacting between a first proximity transceiver being associated to said customer device and a second proximity transceiver and thereby generating interaction information,
said interaction information comprising a trigger for access and activation of a service to be provided by said server device to said customer device, wherein said method comprises:
defining an object called proximity-object and defining thereby at least one parameter related to said interaction information, a data structure of said object and said parameter being defined according to the management protocol defined according to the Technical Report TR-069 of the DSL Forum Issue 1, Amendment 2;
interchanging between said server device and said customer device at least one name-value pair of said at least one parameter of said proximity-object by means of messages according to said management protocol; and
forwarding by said first proximity transceiver to a proximity processor of said customer device at least part of said interaction information for comprising by said proximity processor in such a message for said server device.

2. The method according to claim 1, wherein said interaction information comprises an identification of said second proximity transceiver.

3. The method according to claim 1, wherein said method further comprises
storing of said at least one name-value pair of said at least one parameter of said proximity-object at said server device.

4. The method according to claim 1, wherein said method further comprises
directly retrieving from said messages and storing in relation to each other of said at least one name-value pair of said at least one parameter of said proximity object; and anyone of said customer device and a user of said customer device at said server device.

5. A customer device in a proximity based interaction environment for communicating with a server device, said customer device being associated to a first proximity transceiver for interacting with a second proximity transceiver whereby interaction information being generated,
said interaction information including a trigger for access and activation of a service to be provided by said server device to said customer device,
wherein said customer device interchanges with said server device at least one name-value pair for at least one parameter of a proximity-object by means of messages of a management protocol defined according to the Technical Report TR-069 of the DSL Forum Issue 1, Amendment 2, a data structure of said proximity-object with said at least one parameter being defined according to said management protocol, said at least one parameter being related to said interaction information,
wherein said customer device includes a proximity processor to receive from said first proximity transceiver at least part of said interaction information and to include said interaction information in such a message for said server device.

6. A server device for communicating with a customer device being located in a proximity based interaction environment and being associated to a first proximity transceiver that interacts with a second proximity transceiver and that thereby generates interaction information,
said interaction information includes a trigger for access and activation of a service to be provided by said server device to said customer device,
wherein said server device is enabled to interchange with said customer device at least one name-value pair of at least one parameter of a proximity-object by means of messages of a management protocol defined according to the Technical Report TR-069 of the DSL Forum Issue 1, Amendments 2, a data structure of said proximity-object with said at least one parameter being defined according to said management protocol, said at least one parameter being related to said interaction information,
wherein said server device is configured to receive at least part of said interaction information from a proximity processor of said customer device and to include said interaction information in such a message for said server device.

7. The server device of claim 6, wherein said server device comprises a first memory to store said at least one name-value air of said at least one parameter of said proximity-object.

8. The server device of claim 6, wherein said service device is enabled to directly retrieve from said messages of said management protocol customer device information and information of an end-user of said customer device, being inherent available information according to said management protocol, and to store in a second memory and in relation to each other:
said at least one name-value pair of said at least one parameter of said proximity-object; and
said customer device and a user of said customer device at said server device.

* * * * *